United States Patent
Clarke

(10) Patent No.: US 7,627,508 B2
(45) Date of Patent: Dec. 1, 2009

(54) METHOD FOR TRACKING EMPLOYEES

(75) Inventor: Spencer Roy Clarke, Amissville, VA (US)

(73) Assignee: S.R. Clarke, Inc., Gainesville, VA (US)

( * ) Notice: Subject to any disclaimer, the term of this patent is extended or adjusted under 35 U.S.C. 154(b) by 287 days.

(21) Appl. No.: 11/324,490

(22) Filed: Jan. 4, 2006

(65) Prior Publication Data

US 2007/0185722 A1 Aug. 9, 2007

(51) Int. Cl.
*G06Q 40/00* (2006.01)
(52) U.S. Cl. ............... 705/35; 705/7; 705/8; 705/9
(58) Field of Classification Search .............. 705/35, 705/7–9
See application file for complete search history.

(56) References Cited

U.S. PATENT DOCUMENTS

| | | | |
|---|---|---|---|
| 5,758,324 | A | 5/1998 | Hartman et al. |
| 5,884,270 | A | 3/1999 | Walker et al. |
| 6,564,188 | B2 | 5/2003 | Hartman et al. |
| 6,718,345 | B2 | 4/2004 | Hartman et al. |
| 6,742,002 | B2 | 5/2004 | Arrowood |
| 6,785,679 | B1 | 8/2004 | Dane et al. |
| 2002/0002479 | A1 | 1/2002 | Almog et al. |
| 2002/0143573 | A1 | 10/2002 | Bryce et al. |
| 2002/0169631 | A1 | 11/2002 | Lewis |
| 2003/0055699 | A1 | 3/2003 | O'Connor |
| 2003/0066029 | A1 | 4/2003 | Vizina |
| 2003/0125970 | A1 | 7/2003 | Mittal et al. |
| 2003/0195767 | A1 | 10/2003 | Hartman et al. |
| 2004/0107192 | A1* | 6/2004 | Joao ................ 707/3 |
| 2004/0215623 | A1 | 10/2004 | Dane et al. |
| 2005/0055232 | A1 | 3/2005 | Yates |
| 2005/0240431 | A1* | 10/2005 | Cotter .............. 705/1 |

FOREIGN PATENT DOCUMENTS

JP  2000-003390  1/2000

(Continued)

OTHER PUBLICATIONS

Tech tools: Keeping up with contacts Gabrielle Birkner. Sales and Marketing Management. New York: Aug. 2001. vol. 153, Iss. 8; p. 24, 1 pgs.*

(Continued)

*Primary Examiner*—Lalita M Hamilton
(74) *Attorney, Agent, or Firm*—Stites & Harbison PLLC; Stephen J. Weyer

(57) ABSTRACT

A method is provided for tracking prescreened candidates by a tracking employer. A database is created of prescreened candidates having been previously selected by the tracking employer as candidates the employer wishes to track. The candidates are selected from the group consisting of prospective employees and former employees. The database comprising data regarding the candidates, to which the tracking employer can access. The data of the candidates in the database is updated, over time, e.g. at regular intervals, preferably via personal human contact with the candidate, thereby keeping the data of the candidate current. The tracking employer can monitor the candidates over time, allowing the employer to track prospective employees or former employees to thereby permit the tracking employer to hire the prospective employee or re-hire the former employee. The method establishes and maintains a long term, personal relationship between the tracking employer and the candidate, allowing the tracking employer to hire or re-hire the candidate under the most favorable circumstances since the candidate views the tracking employer as an ally in his or her career.

29 Claims, 1 Drawing Sheet

FOREIGN PATENT DOCUMENTS

| WO | WO 01/39078 | 5/2001 |
|---|---|---|
| WO | WO 03/091929 | 11/2003 |

OTHER PUBLICATIONS

TrekLogic Technologies Inc.: Brainhunter and the Canadian Professional Sales Association Launch www.salesjobsCanada.com Business Wire. New York: Mar. 26, 2004. p. 1.*

H3.com Secures Patent for Facilitating and Tracking Personal Referrals via E-mail Business Wire. New York: Dec. 7, 2005. p. 1.*

People Trak http://www.people-trak.com Jun. 20, 2005.

Trak-It Solutions http://www.trak-it.com Jun. 22, 2005.

Talent Secure http://ww.talentsecure.com Jun. 22, 2005.

RecruitMax http://www.recruitmax.com/eng/resume_tracking.cfm Jun. 22, 2005.

SmartSearch http://smartsearchonline.com/products.asp Jun. 22, 2005.

CIS Media www.cismedia.com/cismedia2003/applicant_info_management_system.htm Jun. 22, 2005.

PCRecruiter http://www.pcrecruiter.com/products.htm?WSCam=Other&WSEvt=sftwrnetwk Jun. 22, 2005.

The Software Network http://www.thesoftwarenetwork.com/Applicant-Tracking-Software Jun. 22, 2005.

* cited by examiner

METHOD FOR TRACKING EMPLOYEES

FIELD OF THE INVENTION

The present invention relates to a method for tracking prospective employees, and, in particular, a method for tracking former employees and prospective employees with whom a former employer or prospective employer has an interest.

BACKGROUND OF THE INVENTION

Several conventional methods exist for establishing an employment relationship between an employer and an employee. One such common method includes an employer conducting its own employIn this method, the employer collects résumés of prospective employees, conducts interviews and eventually hires an employee. ee search itself or through its own human resources department.

In an alternative method of hiring an employee, an employer may outsource part of the hiring process, for example, to an employment recruiter. The employment recruiter initially posts a job opening, collects résumés from prospective employees, and conducts initial interviews of the prospective employee. The recruiter then recommends a prospective employee to one of its client, i.e., the prospective employer, who then makes the final decision as to whether to hire the prospective employee.

In yet another employee hiring method, a party wishing to fill a position may use a temporary agency to staff its temporary needs. In this relationship, the temporary agency first hires employees. Then, the temporary agency uses its employees to staff positions with the temporary agency's clients. Thus, in this employment placement method, when one of the clients of the temporary agency has a staffing need, the temporary agency staffs the client with one of the temporary agency's employees.

With regard to any of the aforementioned hiring methods, often, during the hiring process, one may review the résumé of a prospective employee and even interview that prospective employee, which, at the time, the prospective employee does not meet the current criteria of the party with the hiring need. However, in the future, that prospective employee could be someone the hiring party may wish to hire. In addition, as time passes, it is likely that the prospective employee who currently does not meets ones staffing needs will acquire additional skills and work experience, making that prospective employee even more desirable to be hired in the future. Unfortunately, current hiring methods do not allow or encourage a prospective employer to maintain a relationship with a prospective employee who the prospective employer does not wish to currently hire, or for a prospective employer to track the employment of a prospective employee who the prospective employer may wish to hire in the future.

Further, prior methods do not permit an employer to follow the employment of an employee after the employee ceases to be employed by the employer. For example, employees leave employers either voluntarily or involuntarily, often, leaving on good terms, and are considered good employees by the employers. An employee may leave to explore other career opportunities or the employer may no longer have a need for the position which the employee filled. However, in the future, the position may re-open or a different position may open requiring skills which the former employee has since acquired after leaving the company. Unfortunately, current hiring methods do not encourage the former employer to formally track the employment history of an employee after the employee is no longer employed, i.e., after the employee leaves, voluntarily or involuntarily.

Accordingly, there exists a need in the art for a new and improved method for maintaining contact with former employees and prospective employees and for tracking their work experiences and skills perpetually being acquired.

SUMMARY OF THE INVENTION

The present invention concerns a novel method for maintaining a relationship with a prospective employee or a former employee, collectively referred to as a candidate, which advantageously implements technological advancements in computer databases and computer networks in conjunction with personal contact and video technology. In one form, the method allows an employer to select employment candidates, i.e. prospective employees and/or former employees, to track. The employer presents the list to its agent, referred to as a human capital manager, who then collects, creates and maintains a database comprising the list of the candidates and associated employment data. The employment data can include a streaming video interview of the candidate and comments made by the employer regarding the candidate, current work history, employment history, contact information, résumé, etc. Since the database is maintained by the human capital manager, the employer can optimize its hiring practice by not having to maintain a large human resources department. Advantageously, the prospective employer can directly access the database, thus meeting speed and quality needs.

The human capital manager takes an active role in soliciting, collecting, and storing the employment data of each candidate after the candidate has been selected by the employer to be tracked. Preferably, the human capital manager personally contacts the candidate either by telephone or in person. The human capital manager maintains the employment data current for all candidates over potentially a long period of time.

The present invention, in one form thereof, relates to a method for tracking employment candidates by a tracking employer. A database is created of candidates having been previously selected by the employer as candidates the employer wishes to track. The candidates are selected from the group consisting of prospective employees and former employees that the employer may wish to rehire. The database comprises information regarding the candidates, to which the tracking employer can access. The information of the candidates in the database is updated, over time, such as at regular intervals, with data provided by the candidates, thereby keeping the data of the candidate current. The employer accesses the database and optionally is provided with updates or alerts, to monitor the candidates over time so that the employer can track candidates.

In one alternative further embodiment, the candidate is a former employee and the data of the candidate is updated after the candidate is no longer employed with the tracking employer.

In another alternative further embodiment, the database may include a video interview of the candidate which is associated with the data of the respective candidate. The interview may be conducted by either the employer or by an agent of the employer such as a human capital manager. Advantageously, the interview is digitized and stored electronically, by the human capital manager, in the database for remote viewing by the employer. The updated data may include updated work experiences or skills gained by the candidate while employed by another employer, or if the candidate is a former employee, experience or skills gained by the candidate since becoming a former employee. Further, the updated information may be solicited by the human capital manager from the candidate.

In an alternative form, the employer may include comments to be associated with one or more candidates' data for future consideration by the tracking employer. For example, the tracking employer can track or monitor the work experiences and skills which a candidate is acquiring while being employed by another employer. Then, after the candidate has accumulated desired skills or when the tracking employer has an opening for someone with the background which the candidate has since acquired, the tracking employer can select the candidate for employment.

One advantage of the present method is provided by a feature which allows an employer to track a candidate for which the employer currently does not have an opening or staffing need but may have a need in the future. Tracking is provided by an employment recruiter or a human capital manager maintaining a current and up to date database of a candidate's current work history and skills acquired via, e.g., a current résumé which is continuously or periodically updated by the human capital manager regardless of the candidate's employment status. In addition, the tracking feature allows a tracking employer to track the future work history of a candidate who is a former employee, allowing the tracking employer to rehire the former employee at some point in the future should the tracking employer's staffing needs include someone with the background of the former employee. For example, should the former employee acquire skills for which the tracking employer now has a staffing need, the tracking employer can rehire the former employee. As a result, the present method allows for establishing a long-term relationship between prospective employers and prospective employees and between former employers and former employees.

BRIEF DESCRIPTION OF THE DRAWING

Additional features and advantages of the present method are provided with reference to the sole FIGURE which is a schematic flow chart of a preferred method in accordance with the present invention.

DETAILED DESCRIPTION OF THE INVENTION

Figure 1:
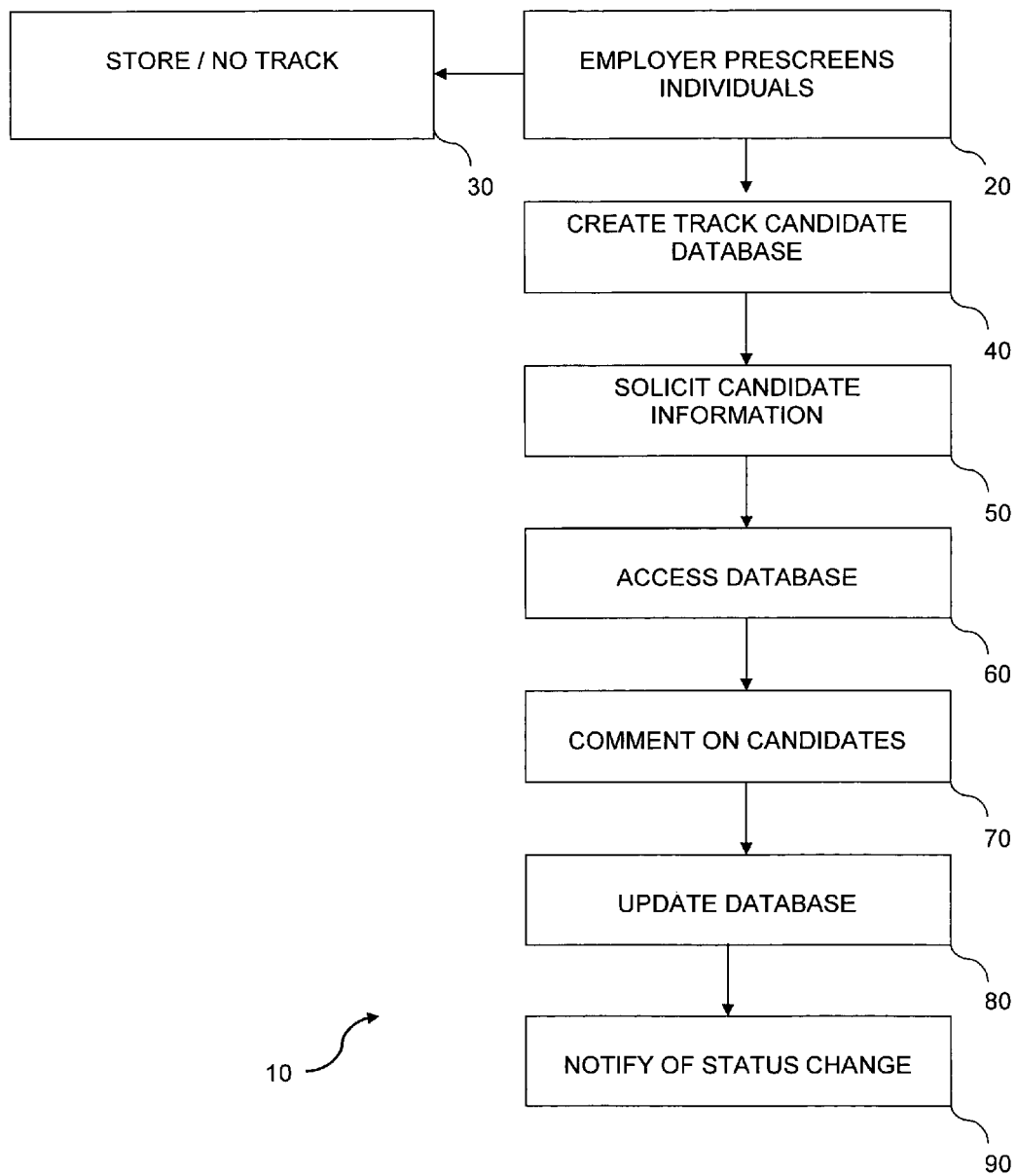

Referring now to the FIGURE, the first step of tracking method 10 is for an employer to notify a human capital manager, who is an agent of an employer, of individuals the employer has an interest (step 20). The individuals are identified or prescreened by the employer as being in one of two categories, track or no track (step 20). The employer identifies or prescreens individuals based on a prior working relationship with the individuals (step 20). During the prescreening process, the employer decides whether the individuals are not a good match for the employer and therefore the employer does not wish to track the individuals or whether the individuals are candidates the employer wishes to track (step 20). The employer then contacts the human capital manager and informs him or her of individuals the employer does not wish to track and candidates the employer wishes to track.

With regard to the no track individuals, the employer submits the individuals' names and possibly their receptive résumés to the human capital manager (step 20). Then, the human capital manager stores the no track individuals' names and any related information, e.g. résumés, which the employer wishes the human capital manager to maintain, and these individuals are not tracked (step 30). Non-tracked individuals will not be contacted by the human capital manager. The no track list allows an employer to maintain a list of individuals who the employer previously screened and made an affirmative decision that these individuals are not good candidates for employment. In the future, should an individual on the no track list resubmit a résumé, the employer can refer back to the no track list, and not further consider the individual. As a result, the no track list maintains human capital information of an employer with regard to prior employment decisions, allowing the employer to not spend valuable time, re-considering an individual the employer already considered and decided was not a good match for the company.

As noted above, track individuals are candidates, selected by the tracking employer, whom the employer wishes to track (step 20). The candidates include prospective employees and former employees. For example, the tracking employer can select candidates who the tracking employer does not currently have a hiring need but may have a hiring need in the future and can include former employees who the tracking employer would consider rehiring in the future. As with the no track individuals, the employer first notifies the human capital manager of candidates the employer wishes to track and preferably forwards the human capital manager the résumés of the respective candidates (step 20). The human capital manager then creates and maintains a database for the candidates which includes the names of the candidates and associated employment information (step 40). The database can be stored on a server of the human capital manager or by a third party provider at the request of the human capital manager to host and maintain a computer server which hosts and stores the database.

After the tracking employer informs the human capital manager of the names of the candidates the employer wishes to track for possible employment, the human capital manager performs the duties of soliciting information regarding the candidates, entering that information into the database, and keeping the information current by periodically updating it (step 50). Preferably, the data is solicited by personally contacting the candidates, e.g. by telephone or in person, thus fostering a personal, deep, and meaningful relationship between the candidates and the human resource manager. Moreover, since the human capital manager is an agent of the tracking employer, the personal contact nurtures a strong and meaningful relationship between the candidates and the tracking employer.

The solicited data includes a current résumé for each candidate which includes the candidate's employment history, skills and other information typically found in a résumé. In addition, the information may include geographic preference, salary demand, availability, and motivation.

The database created by the human capital manager also may include video interviews which the human capital manager conducted with the candidates. (step 50). Advantageously, the database is electronic in accordance with conventional electronic databases known to one of ordinary skill in the art currently or any future forms of electronic database commensurate with the scope of the present invention. Advantageously, the video interviews are associated with the data of the respective candidate and available for viewing by the tracking employer. For example, the video interviews may be stored so that they can be transmitted as a streaming video.

Storage of the video interview maintains valuable human capital and intellectual property capital of the employer. In convention hiring practices, much information obtained by an employer during a candidate's interview is gleaned by observing a candidate respond to questions posed by an officer or employee of the employer. Such gleaned information includes personal impressions the candidate leaves with the employer as a result of the interview. Should that officer or employee leave the company, he or she takes with him or her that information gleaned during the interview. However, using the present method, the stored video interview preserves the human/intellectual property capital of the employer so that the employer has access to it, even if the party who conducted the interview is no longer with the company. As a result, the employer can review previously conducted interviews to determine whether a candidate is a good match for a future position.

The tracking employer is given access to the database (step 60). Advantageously, the tracking employer accesses the database using a computer network such as the Internet or other network thereby allowing the tracking employer to gain access to the database. Access to the database (step 60) is advantageously limited to the tracking employer through conventional user account or ID and password authorization. For example, the tracking employer will be required to set up an account and password before being able to gain access to the database.

The tracking employer can then search the database (step 60) and view the résumés and other data of the candidates. If available, the employer can view a video interview of the candidate, previously conducted by the human capital manager or by the employer (step 70). As previously noted, advantageously, the interview is stored in the database so as to be provided as streaming video. The database is searchable by candidate name, geography, comments previously made by the employer (step 70), salary demands, etc.

Tracking employers can provide comments which are associated with the respective candidate at step 70. These comments may include statements by the tracking employer of a candidate who the tracking employer may consider as a future hire but for whom the tracking employer currently does not have an immediate need. Further, the tracking employer can conduct its own interviews of the candidates and store the interviews in the database, associated with the respective candidate.

The data in the database is updated (step 80) regularly thereby the data in the database remains current. For example, the résumés or the data of the candidates may be updated on a regular or periodic basis such as every few months as solicited by the human capital manager. As with soliciting candidate information (step 50), preferably, the human capital manager personally contacts the candidate either on the telephone or in person to request updated information, thereby, maintaining and fostering a strong, personal relationship between the tracking employer and the candidate by the regular personal contacts of the human capital manager with the candidate. Should the human capital manager not be able to personally contact the candidate, alternatively, the candidate may be provided with an email requesting the candidate to update his/her information. In addition, the data can be updated voluntarily, i.e., without solicitation, by the candidate to provide the human capital manager with current updated data with regard to the candidate. Either way, the data may include work experience and skills gained by the candidate while employed by another employer, current salary, projects on which the candidate has worked, personal contact information of the candidate and any other data which may be included with the candidate's résumé.

In addition to providing access to the database, the human capital manager can provide updates to the tracking employer by email or other "push" technology as appropriate (step 90). A tracking employer can be sent an email from the human capital manager after the candidate has updated his/her data with information the tracking employer would find relevant. For example, a tracking employer tracking a former employee subsequently hired by another company can receive an email after the candidate indicates he is now available for employment (step 90). In addition, the tracking employer can notify the human capital manager to monitor specific information updated by a candidate or skills now acquired of which the tracking employer would like to be made aware and thus, automatically trigger an email notice to be sent to the tracking employer (step 90).

The present method can be implemented to track different types of candidates under varying scenarios. One example would be to use this method to track candidates prescreened at a college job fair. An employer solicits résumés from individuals in advance of the job fair and selects desirable individuals to interview. Next, the employer interviews the selected individuals. Subsequent to the interviews, the employer notifies the human capital manager of candidates whom the employer wishes to track and forwards a copy of the candidates' résumés. The employer may also provide the human capital manager with a list of individuals and respective résumés whom the employer wishes to be maintained but not tracked. Next, the human capital manager contacts the candidates via telephone or in person, to solicit additional employment information. At period intervals, e.g. every three months, the human capital manager personally contacts the candidates by telephone or in person, to update the candidates' information. Over the course of several years, the candidates continue to acquire skills. With each personal contact of the human capital manager with the candidate, the employer fosters a deeper, long last relationship with the candidate. Then, e.g. at year five, the employer now has an opening for someone with the employment background and skills of one of the tracked candidates. The employer then hires that candidate with whom the employer has built a relationship over the past five years of tracking.

A second example of how the present method can be implemented is for use in tracking desirable candidates who submit unsolicited résumés to a company which does not have an immediate need for that candidate. For example, often a company will receive unsolicited résumés by very qualified individuals who the company may wish to hire if the company had an opening for someone with that individual's background. Using the present method, an employer can notify the human capital manager of individuals who are candidates it wishes to track. Further, rather than sending the qualified individual a typical rejection letter, the candidate is personally contacted by the human capital manager and told that the employer is very interested in him or her and would like to track his or her career in the hopes of hiring him or her when an appropriate opening occurs. Then, when an opening becomes available, the employer can select the most qualified candidate from those it has been tracking.

A third example of how the present method can be used is to track a former employee whom the employer considers valuable to the company. For example, an employee may leave a company to explore other career opportunities, e.g. a different profession or return to school for an additional degree, or an employee may be disgruntled citing a personal conflict with another employee. Regardless why the employee left, the employer considers the former employee an asset to the company and one the company would rehire if the opportunity presented itself. In such an instance, the employer contacts the human resource manager who then tracks the former employee. In the future, should the former employee who left to explore other career options acquire skills for which the employer has an opening, the employer can rehire the former employee. Similarly, in the case of the disgruntled employee who left citing a conflict with an other employee, should the conflicting employee leave the company, the former employee can be rehired, since the employer has maintained a relationship with the former employee.

A fourth example of how the present method can be implemented is to preserve a company's human capital and knowledge. Within the course of business, executives leave and/or are terminated. Typically, when these executives leave, they take with them important company knowledge and trade secrets regarding candidates a company may wish to hire and the company in general. The present method preserves this company knowledge and trade secrets through the human capital manager's database which is kept current and always accessible to the employer. Further, with regard to other trade secrets or company knowledge held by a former executive which a company may wish to rehire or retrieve information from that individual, the present method can be used to maintain a relationship with the former executive so that an employer can retrieve that information from the executive should the employer need it in the future.

It will now become obvious to one of ordinary skill in the art that the present method provides features and advantages not found in prior employment hiring methods. For example, the present method allows both a human capital manager, and through the human capital manager, an employer, to track candidates over a long term, e.g. from a point when the candidate did not meet an immediate hiring need, such as, from not having an opening for someone with the skills of the candidate, to some point when the candidate has acquired needed skills, or from after employment ends until the employee is rehired. This allows an employer to build and maintain a relationship with prospective employees and to maintain a relationship with former employees which the employer considers valuable. For example, if a former employee leaves a company which the company considers to be a good employee, the former employee acquires additional skills, and later the employer has a hiring need for someone with the now newly acquired skills of the previously desired, former employee, the employer, using the present method, is able to track the former employee's acquired skills and then rehire that employee when the employer has the new hiring need for which the former employee has gained experience.

Further, the present method allows an employer to interview a candidate and find a person who has particular skills which the tracking employer desires but does not have an immediate opening. Data regarding this candidate and comments including possibly an interview conducted by the tracking employer which can be stored in the database for access by the tracking employer in the future so that when an opening occurs, and the tracking employer has a staffing need for someone with the background of the previously identified desirable employee, the tracking employer can hire that employee. Thus, unlike current employment methods where non-hired candidate receives a rejection letter, using the present method, an employer establishes and maintains a personal relationship with the selected candidate, over time, until such time the employer chooses the candidate for employment. Moreover, the present method provides direct contact with a candidate via the human capital manager, reinforcing and stressing the importance of the candidate.

An additional advantage of the present method is that it preserves an employer's human capital. Human capital regarding potential employees and former employee are maintained in the database by the human capital manager, which is accessible, at any time by an employer. Conversely, in convention hire practices, information regarding a candidate for whom an employer does not have an immediate need or a former employee is seldom, if ever maintained by human resource personal or executive of the employer. Should that human resource person or executive leave the company, he or she takes with him or her any knowledge or information regarding the candidate. Therefore, unlike conventional methods where human capital is lost when an employee leaves a company, the present method preserves human capital from being lost.

A further advantage of the present method is that it establishes and maintains a long term, personal relationship between an employer and a candidate. Each regular personal human contact of the human capital manager with the candidate strengthens and reinforces the understanding that the employer is an ally of the candidate in his or her career. Consequently, the employer is able to hire the employee under the most favorable circumstances.

It will now be clear to one of ordinary skill in the art that the present recruiter method is distinguishable from temporary agency methods of staffing personnel. Unlike temporary agencies where the employee is employed by the temporary agency and placed with clients of the temporary agency on a temporary basis when a client has a particular staffing need, in the present recruiter method, the employees are hired by the clients of the human capital manager, not the human capital manager itself. Thus, the present method is unlike temporary employment agencies. Further, the present method is unlike conventional employment recruiters in that the human capital manager maintains a database and thus a relationship with an employee after the employee is placed with an employer and during that employment.

Although the invention has been described above in relation to preferred embodiments thereof, it will be understood by those skilled in the art that variations and modifications can be effected in these preferred embodiments without departing from the scope and spirit of the invention.

What is claimed:

1. A computer-implemented method for tracking employment candidates in which the candidates are either not available for immediate employment or the employer does not have a current opening for the candidate, by a tracking employer for possible future hire, said method comprising:

selecting, via a computer or a computer network, candidates from the group consisting of perspective employees not currently available for hire and perspective employees for whom a tracking employer does not have a current opening, by the tracking employer as candidates the employer wishes to track for future consideration for hire;

creating an electronic database of those candidates, said database comprising information regarding the candidates;

updating the data of the candidates in the electronic database after having been selected by the employer, over time, with data provided by the candidate, thereby keeping the data of the employee current;

maintaining and/or establishing a business relationship between the tracking employer and the perspective employee until such time as the tracking employer is no longer interested in the perspective employee or the perspective employee no longer wishes to be tracked by the employer; and providing access of the database to the tracking employer, via a computer or a computer network, thereby allowing the tracking employer to monitor the candidates over time so that the tracking employer can track the candidate and possibly hire the candidate.

2. The method of claim 1, wherein said updating the data comprises personally soliciting information from the candidate.

3. The method of claim 1, further comprising sending updated information to the tracking employer regarding a candidate when data has been updated.

4. The method of claim 1, wherein said updating the data of the candidate comprises updating work experience or skills gained by the candidate.

5. The method of claim 1, wherein said updating comprises updating data provided by the candidate while employed by another employer.

6. The method of claim 5, wherein said updating comprises soliciting information from the candidate while the candidate is employed by another employer.

7. The method of claim 1, wherein said updating comprises updating data provided by the candidate after the candidate is no longer employed by the tracking employer.

8. The method of claim 7, wherein said updating comprises soliciting information from the candidate after the candidate is no longer employed by the tracking employer.

9. The method of claim 1, wherein said creating a database comprises creating a video interview of the candidate which is associated with the data of the respective candidate.

10. The method of claim 9, wherein said interview is conducted by the tracking employer.

11. The method of claim 9, wherein said interview is conducted by an agent of the tracking employer.

12. The method of claim 9, wherein said interview is digitized and stored electronically by an agent of the tracking employer in the database for remote viewing by the tracking employer.

13. The method of claim 1, wherein said data in said database comprises a résumé for each candidate.

14. The method of claim 1, wherein said database is maintained by an agent of the tracking employer.

15. The method of claim 1, wherein said allowing the tracking employer to search the database comprises accessing the electronic database by the tracking employer via a computer network.

16. The method of claim 1, further comprising storing comments of the tracking employer regarding a candidate, associating those comments with the candidate listed in the database and limiting access to those comments to no other employer other than the tracking employer.

17. The method of claim 1, wherein said creating a database comprises soliciting employment data from one or more candidates after the one or more candidates have been selected by the tracking employer.

18. The method of claim 1, wherein said updating comprises soliciting information from the candidate.

19. The method of claim 18, wherein said soliciting information comprises soliciting information while the candidate is employed with another employer.

20. The method of claim 1, wherein said creating a database comprises soliciting information from the candidate.

21. The method of claim 1, herein said creating a database comprises creating the database by a human capital manager.

22. The method of claim 1, wherein said updating the data of the candidates in the database, over time, comprises updating the data on regular intervals.

23. The method of claim 22, wherein said updating comprises personal human contact with the candidates.

24. The method of claim 1 wherein the tracking employer monitors the candidate over time which is greater than three months.

25. The method of claim 1 wherein the tracking employer monitors the candidate over time which is at least one year.

26. The method of claim 1 wherein the tracking employer monitors the candidate over time which is up to five years.

27. A computer-implemented method for tracking employment candidates in which the candidates are either not available for immediate employment or the employer does not have a current opening for the candidate, by a tracking employer for possible future hire, said method comprising:

selecting candidates, via a computer or a computer network, from the group consisting of perspective employees and former employees not currently available for hire and perspective employees and former employees for whom a tracking employer does not have a current opening, by the tracking employer as candidates the employer wishes to track for future consideration for hire;

creating an electronic database of those candidates, said database comprising information regarding the candidates;

updating the data of the candidates in the database after having been selected by the employer, over time, with data provided by the candidate, thereby keeping the data of the employee current;

maintaining and/or establishing a business relationship between the tracking employer and the perspective employee until such time as the tracking employer is no longer interested in the perspective employee or the perspective employee no longer wishes to be tracked by the employer; and providing access of the database to the tracking employer, via a computer or a computer network, thereby allowing the tracking employer to monitor the candidates over time so that the tracking employer can track the candidate and possibly hire the candidate.

28. The method of claim 27, wherein said updating the data of the candidate comprises updating the data after the candidate is no longer employed with the tracking employer.

29. The method of claim 27 wherein the tracking employer monitors the candidate over time which is at least one year.

* * * * *

UNITED STATES PATENT AND TRADEMARK OFFICE
CERTIFICATE OF CORRECTION

PATENT NO. : 7,627,508 B2  Page 1 of 1
APPLICATION NO. : 11/324490
DATED : December 1, 2009
INVENTOR(S) : Spencer Roy Clarke It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 441 days.

Signed and Sealed this

Second Day of November, 2010

David J. Kappos
*Director of the United States Patent and Trademark Office*